United States Patent
Merat et al.

(10) Patent No.: US 11,876,826 B2
(45) Date of Patent: Jan. 16, 2024

(54) ASSESSING CYBER COMPETENCE BY ANALYZING HUMAN BIOMETRICS USING NEURAL NETWORK MODEL

(71) Applicants: Soorena Merat, Toronto (CA); Wahab Almuhtadi, Ottawa (CA)

(72) Inventors: Soorena Merat, Toronto (CA); Wahab Almuhtadi, Ottawa (CA)

( * ) Notice: Subject to any disclaimer, the term of this patent is extended or adjusted under 35 U.S.C. 154(b) by 298 days.

(21) Appl. No.: 17/479,401

(22) Filed: Sep. 20, 2021

(65) Prior Publication Data
US 2022/0094707 A1   Mar. 24, 2022

Related U.S. Application Data

(60) Provisional application No. 63/080,318, filed on Sep. 18, 2020.

(51) Int. Cl.
| | |
|---|---|
| H04L 9/40 | (2022.01) |
| G06N 5/04 | (2023.01) |
| G06N 3/049 | (2023.01) |
| G06V 40/18 | (2022.01) |

(52) U.S. Cl.
CPC ......... *H04L 63/1433* (2013.01); *G06N 3/049* (2013.01); *G06N 5/04* (2013.01); *G06V 40/197* (2022.01)

(58) Field of Classification Search
None
See application file for complete search history.

(56) References Cited

U.S. PATENT DOCUMENTS

| | | | |
|---|---|---|---|
| 2019/0286973 A1* | 9/2019 | Kovvuri | G06N 3/04 |
| 2020/0135049 A1* | 4/2020 | Atencio | G09B 5/12 |

* cited by examiner

*Primary Examiner* — Cai Y Chen
(74) *Attorney, Agent, or Firm* — Nasser Ashgriz; UIPatent Inc.

(57) ABSTRACT

The present invention discloses a system and method for assessing the cyber competence of a user by analyzing human biometrics using a neural network model. According to an embodiment, the system collects human biometrics data, including eye movement data from biometric sensing device of a user, analyses the human biometrics data using an adaptive neural network model that performs rational inference to learn the correlation between the human biometric and mental disorder and provide an assessment of a cyber competence for the user based on identified mental disorder. The system may identify definitive cyber risk and assign a cyber competence score for the user using a machine learning model or using a mental disorder-cyber risk correlation table. The system may take preventive actions to prevent cyber-attacks based on the cyber competence score.

20 Claims, 9 Drawing Sheets

600

| MENTAL DISORDER | COMPETENCE SCORE | SECURITY RULES |
|---|---|---|
| DISORDER -1 | 63 | BLOCK ACCESS TO PROTECTED RESOURCE |
| DISORDER -2 | 85 | NO ACTION |
| DISORDER -3 | 30 | BLOCK ACCESS TO NETWORK |
| DISORDER -4 | 20 | DISABLE NETWORK ACCESS |
| ⋮ | ⋮ | ⋮ |
| DISORDER -n | 10 | DISABLE NETWORK ACCESS |

FIG. 6

ASSESSING CYBER COMPETENCE BY ANALYZING HUMAN BIOMETRICS USING NEURAL NETWORK MODEL

CROSS-REFERENCE TO RELATED APPLICATION

The present invention claims the benefit of U.S. Provisional Application No. 63/080,318 entitled "Novel Application of Neural Network in Social Cyber Competence Testing" filed on Sep. 18, 2020, the disclosures of which are incorporated herein by reference in their entireties.

FIELD OF THE INVENTION

The present invention relates in general to assessment of the cyber competence of a user. In particular, the present invention relates to a system and method for assessing the cyber competence of a user by analyzing human biometrics using a neural network model.

BACKGROUND OF THE INVENTION

Users of computing devices may have different levels of cyber-security awareness, such that some users are more vulnerable than others to cyber-attacks. As users from all age groups having different mental and physical health conditions are adopting computing devices for various activities and consuming network services, monitoring their cyber security awareness or cyber competence become essential. Individuals, parents, academic institutions, and enterprises are always concerned about the cyber risk of concerned individuals.

It has been observed that people's online behavior plays a vital role in maintaining cyber resilience in place. Recent researches suggest that people with mental conditions are more vulnerable to cyber-attacks. A person's permeant or temporary mental impairments can lead to temperament, impulsive online activities that have a great impact on the risk. Online spaces have a residual risk that is associated with unlimited opportunities for people, to get what they are looking for. In addition, mental conditions emerge in many ways, which may be temporal or long-lasting.

Cybercriminals know that people in non-healthy mental conditions can help them with their plans, via induced pleasure-seeking activities and trap them to exploit them personally and launch cyberattacks using their resources. It has been observed that an impaired human brain presents extra capacity for pleasure-seeking because affective disorders can pathologically disable the normal pleasure mechanism. The Brain mechanisms generate a sense of pleasure in a very certain way. For example, in presence of the excessive displeasure, a sense of pleasure can be an evolved trick, serving to motivate a person to pursue rewards. In many cases, the trick is embedded into the un-classified data model and reduces the effectiveness of risk measures in a variety of ways.

There are some existing solutions proposed in the past to assess cybersecurity awareness or cyber risk of an entity. The U.S. Pat. No. 10,511,535 B2 titled "inferential analysis using feedback for extracting and combining cyber risk information" (the '535 patent) describes systems and methods for assessing the risk of a cyber security failure in a computer network of an entity, using a computer agent configured to collect information from at least one accessible Internet element. The system assesses the cyber risk by evaluating the collected circumstantial or indirect information. Another United State Patent Publication 20200135049A1, titled "Method and system for evaluating individual and group cyber threat awareness" (the '049 patent) analyze users response to offensive actions and defensive action and scores cybersecurity awareness of the user. However, the '049 patent requires users' action during cybersecurity awareness evaluation.

A person, especially with an impaired brain, may not take the evaluation if he/she has to take action. Also, the cyber vulnerability of such individuals needs to be assessed always when they are connected to any public or private network. These existing solutions are not helpful in assessing the cyber competence of any individual without an active assessment test.

Therefore, there is a need for a method, and system that can determine the cybersecurity competence of a user, without requiring active user involvement and without taking a dedicated evaluation test.

The present disclosure makes possible a number of the needed solutions and makes a material and substantial improvement to the current state of the art for understanding maintenance needs for resources associated with the entity, help the user get the required level of support, and present personalized contents.

SUMMARY OF THE INVENTION

Systems and methods for assessing the cyber competence of a user by analyzing human biometrics using a neural network model are described. The system collects human biometrics data, including eye movement data from biometric sensing device (e.g., a wearable eye tracking device) of a user, analyses the human biometrics data using an adaptive neural network model that performs rational inference to learn the correlation between the human biometric and mental disorder and provide an assessment of a cyber competence for the user based on identified mental disorder. The system may identify definitive cyber risk and assign a cyber competence score for the user using a machine learning model or using a mental disorder-cyber risk correlation table. In an embodiment, the system may use an adaptive neural network model developed based on Generic-Leaky-Integrate-And-Fire (GLIF) model to identify the mental disorder.

In an embodiment, the system decrypts the human biometrics and decodes its hidden components of risk, based on reward motivation. The adaptive neural network model may use the wake-sleep algorithm in combination with a spiking recurrent neural network to learn and unlearn the correlation between eye movement data, and mental disorder. The model learns the pattern of recorded eye movement using a wake-sleep algorithm. The sleep phase of the wake-sleep algorithm predicts next gaze transitions during a more intense and previously unseen visual task by exploiting the temporal context of gaze fixation and simulating the attention shifts. Wake phase of the wake-sleep algorithm undercover the correlating points between the simulated gaze patterns to the mental disorder. In some embodiments, the adaptive neural network model is trained using recorded eye movement data comprising of several populations of equivalently structured, interconnected, data represented in form of generic leaky integrate-and-fire neurons, which are trained with spike-timing-dependent plasticity (STDP).

In an embodiment, the system is configured to control network access of the user based on the cyber competence score. If the cyber competence score of the user is less than the first predefined threshold, access to a secure part of the network by the user is restricted. If the competence score of the user is less than a second threshold, which is less than the first threshold, the user is disconnected from the network. In an embodiment, the system may cause the user device to disable all communication interfaces automatically based on the determined competence score. In an embodiment, the system can be implemented as a network solution or on an individual user device to protected the user from cyberattacks. The system may prevent the user or a network from being used by the user from a cyber attacker, who would have otherwise exploited the mental conditional of the user to launch different types of cyberattacks. The system alerts the user about cyber vulnerability, disconnects the network connection of the user, and alerts another user about potential cyber security vulnerability caused due to mental disorder of the user.

The proposed system is a hybrid computation model, which performs rational inference to learn the correlation pattern between eye movement and mental disorders. The system learns the pattern of a recorded eye movement and integrates it with a two-phase machine learning engine.

Other features of embodiments of the present disclosure will be apparent from the accompanying drawings and detailed description that follows.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 6 is an exemplary security rule that can be used to protect an enterprise network based on a cyber competence score in accordance with an embodiment of the present disclosure;

DETAILED DESCRIPTION OF PREFERRED EMBODIMENTS

Figure 1:
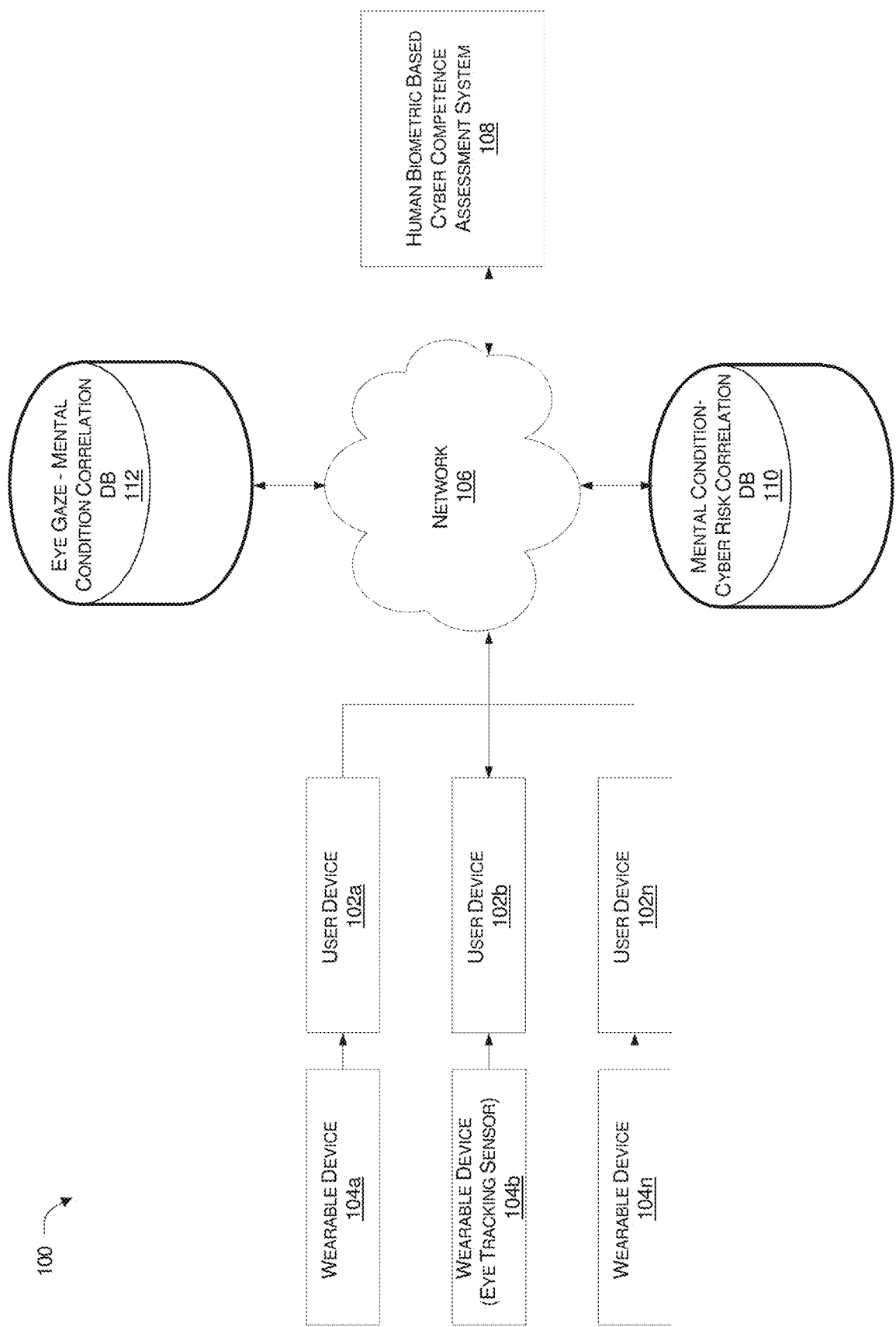
FIG. 1 is a high-level block diagram illustrating a network environment that a human biometric-based cyber competence assessment system can use in accordance with an embodiment of the present disclosure.

The detailed description set forth below in connection with the appended drawings is intended as a description of exemplary embodiments in which the presently disclosed process can be practiced. The term "exemplary" used throughout this description means "serving as an example, instance, or illustration" and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, optical disks, and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Provided here are the system and method for assessing the cyber competence of a user based on human biometrics data. Embodiments of the present disclosure are described with respect to an eye movement and eye gaze data that provide accurate measurement of the user mental condition or disturbance, the proposed system can use any other human biometrics data to determine mental condition or disorder or a user and assess cyber competence of the user. The system may restrict network access of the user and take preventive security measures based on the assessed cyber competence score.

It has been observed that we (humans) have a natural capacity to understand interpersonal and intrapersonal communications. These interactions become such ingrained parts of our daily life that we do notice their impacts on our physiological and behavioral biometrics. One can derive a large range of interpretations from both warding-off gazes as well as direct eye contact based on specific circumstances. Eye movement or eye gaze data can play a vital role in our daily perception.

In 2014, the researchers from Johns Hopkins reported a faster pace of recorded gaze for the people who are less patient, so they would move their eyes at greater speed. The researcher then compared the volunteer's gaze patterns to their trend of impulsivity and found a surprising correlation. In 2010, a study presented the possibility to identify a stray mind by tracking eyes during a reading task. The researchers of the University of Pittsburgh found that eye movement varies depending on the reader's attention or wandering because eyes tend to skip the words during the wandering phase. In 2012, a study by the research team at the university of southern California suggested that the study of eye movements can potentially identify certain types of neurological disorders. This research is focused on how neurodegenerative disorder can affect gaze control and attention during a TV-watching task. A team of researchers at the University of Illinois are studying the possible ways to diagnose psychiatric diseases using gaze tracking and eye movements. They have discovered a vibrant reflection of the neural circuit defects into the irregularities in the way that the eye tracks the objects. For example, schizophrenic patients had difficulties keeping their eyes focused on even very slow-moving objects.

The proposed system correlates gaze tracking patterns and brain abnormalities that allow it to identify the high-risk individuals earlier and create more focused mitigations for people with mental disorders.

FIG. 1 is a high-level block diagram illustrating a network environment that a human biometric-based cyber competence assessment system can use in accordance with an embodiment of the present disclosure. A human biometric-based cyber complete assessment system 108 can receive human biometrics data from a user device (e.g., user device 102a, user device 102b, and user device 102n) through a network 106. The user devices 102a-n may have a client application running to collect biometrics data from respective wearable devices 104a-n attached with it and send the human biometrics data to the system 108.

The wearable device 104a-n may be a VR headset, an eyeglass, or any other wearable device capable of reading eye movement and recording eye gaze data. A wearable device may have an eye-tracking sensor that can track the eye movement of a user. In some embodiments, system 108 may collect human biometric data, including eye movement data from user devices 102a-n, which can be a mobile phone, portable device, laptop, desktop, or any other computing device. The user device itself may have biometric readers that can scan user eye movement. System 108 can also get biometrics data of the user from independent biometric data tracking devices (e.g., a camera or eye-tracking sensor). Eye-tracking sensors, biometric data tracking devices, the biometric reader are referred to interchangeably throughout this document. System 108 may also get eye movement from a surveillance camera and physically installed eye-tracking sensors.

In an embodiment, the client application running on a user device (for example, user device 102a) may also collect the network activity log of the user and share the network activity log with the system 108. The client application can be configured to collect and share the network activity log data only when system 108 identifies that the cyber competence score of a user using the user device is below a predefined threshold.

In an embodiment, system 108 may also be implemented on the user devices in form of a software application and the user device may use network services whenever required for data processing, collecting historical data, and storing the analyzed data. System 108 may use an adaptive neural network to analyze the human biometrics data to determine mental disorder or mental disturbance level and determine the cyber competence score of the user based on the mental disorder or mental disturbance level.

In an embodiment, system 108 may use eye gate-mental conditional correlation database 112 that maintains pre-analyzed eye movement patterns with a certain mental disorder. System 108 may match the eye movement pattern of received human biometric data with eye movement patterns stored in database 112 and identify a mental disorder or disturbance level. In a preferred embodiment, system 108 may use an adaptive neural network model to determine mental disorder or disturbance level based on the received human biometrics data. Once the mental disorder or mental disturbance level is identified, system 108 may refer to a mental conditional-cyber risk correlation data 110 to determine associated cyber risk for the determined mental disorder or mental disturbance level.

In an embodiment, system 108 may use a machine learning model to determine a cyber competence score for the user based on the determined mental disorder or identified mental disturbance level. The eye gaze mental to mental conditional correlation database 112 and mental conditional to cyber risk correlation database 110 can be updated with external input or based on analysis of the adaptive neural network model and machine learning model used to system 108.

Figure 2:
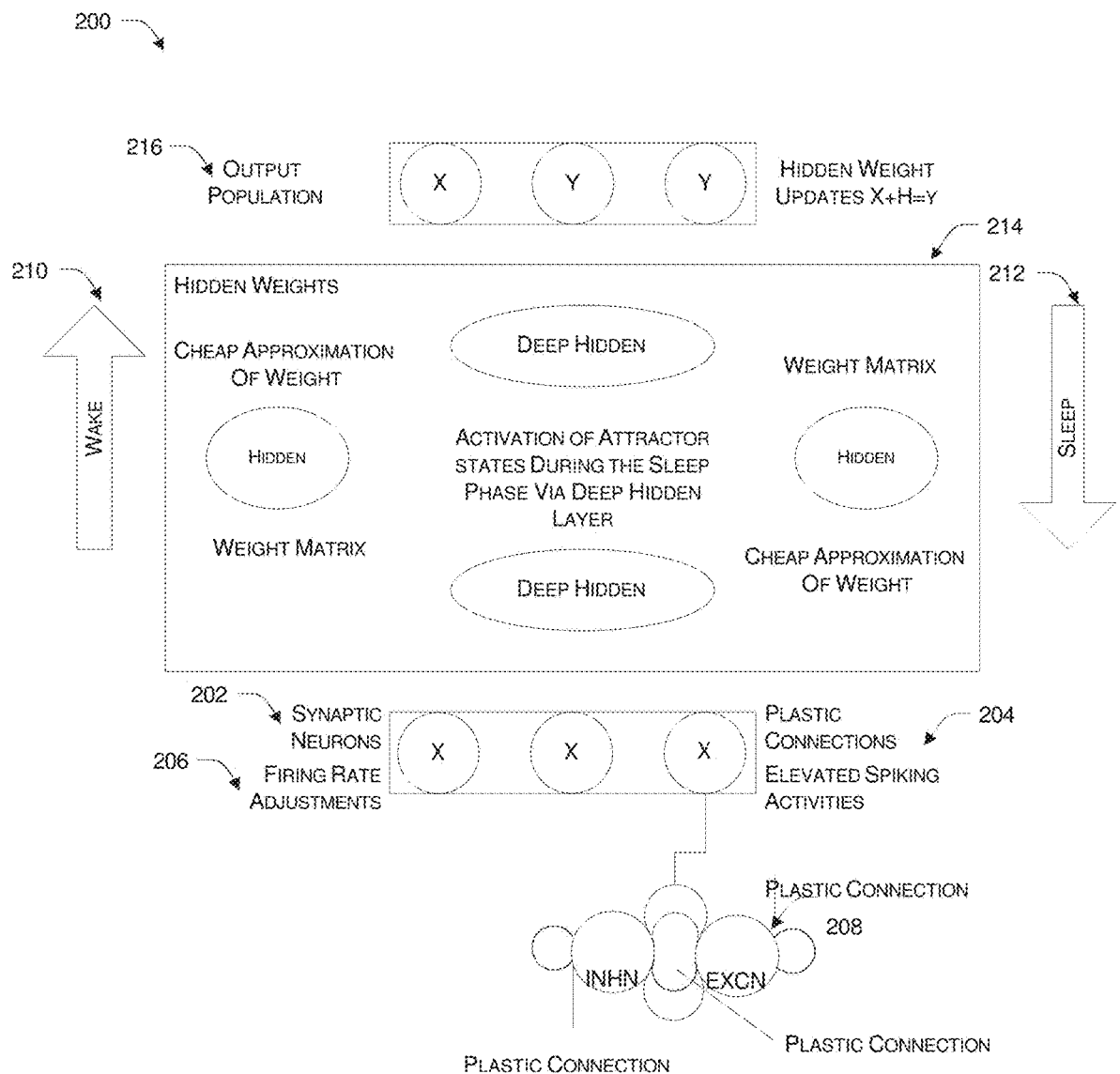
FIG. 2 illustrates a high-level visualization of system architecture and a deep hidden layer of an adaptive neural network model designed in accordance with an embodiment of the present disclosure.

FIG. 2 illustrates a high-level visualization of system architecture and a deeply hidden layer of an adaptive neural network model designed in accordance with an embodiment of the present disclosure. System 108 may use the adaptive neural network model architecture 200 to training itself. System 108 may use a hybrid computation model, which performs rational inference to learn the correlation pattern between eye movement and mental disorders. The model learns the pattern of a recorded eye movement, then integrates it with a two-phase learning machine, called a wake-sleep algorithm.

The model in sleep phase 212 predicts the next gaze transitions during a more intense and previously unseen visual task, by exploiting the temporal context of gaze fixation and simulating the attention shifts. The model in wake phase 210, undercover the correlating points between the simulated gaze patterns to the mental disorder model. The model architecture 200, for learning the recorded eye movement pattern, consists of several populations of equivalently structured, interconnected, generic leaky integrate-and-fire neurons 202, which are trained with spike-timing dependant plasticity (STDP) connection 204. The model may use learning rules that are created based on correlation and the learning rate is configured to be maintained in the low range and that is to avoid the recurrent network feedback effects and maintain the learning dynamics. The firing rate can be adjusted using the firing rate adjustment 206 option provided to better train the system for a specific purpose.

It is observed that the stall gaze points can cause a reduction in the convergence patterns and increase the final inference error, which results in a decrease in final correlation. Hence, to maintain the correlation learning rate, the wake-sleep algorithm, can simulate the gaze transitions while unlearning the gaze stalls. Also for low learning rates, the proposed model is tested and convergence speed has been improved with a reduced rate of inference error. The model may use plasticity 208 and populations with larger excitatory than the inhibitory, also the input population that is composed of a large number of Poisson-spike-generators that provides the Gaussian firing mechanism.

The model may use a weight matrix structure that is based on the inference learning after the X+H=Y and the hidden weights are associated with the excitatory neuron assignments in the H layer 214. The model generates an output population of 216 that can further be used for training.

The logistics are composed of the binary stochastic variables, which bring up to date when the entire unit goes through the passes of a run. The probability of turning the value J is the function of its immediate ancestor K, so the weight matrix can be updated based on a directed connection of Wjk for the $$\frac{1}{2 + \exp(-b_i - \sum_i S_j W_{jk})}.$$

Each of the equivalently structured populations of the GLIF neurons may consist of 4000 neurons with 15% inhibitory and 85% excitatory neurons. After several trials of other ratios of INH-EXC, it has been identified that the 85-15 ratio is a good match for this medal disorder determination application. In an example implementation, the input stage population may consist of a Poisson model of 2000 spike generators, with a Gaussian shape average network bust of 0.3 s as a firing rate profile.

The model may use two forms of STDP to learn the plastic connections. For between excitatory plastics, the three-legged, and for between inhibitory to excitatory, the two-legged rule can be applied. The weight matrix structure and inference of the learning network after successful passes reflect the population activity vs the desired activity in a diagonal format, which is a good representation of the Gaussian shape input patterns over the neuron population. The hidden weights are designed to be a part of the excitatory population's connections and weights are assigned to these hidden layers by averaging the strongest connection in the surrounding peripherals of an excitatory neuron.

The hidden (H) plane 214 consists of the decoded inference learning based on the excitatory firing rate reflection into the surrounding peripherals of excitatory neurons. During the inference test phase, all the plastics can be disabled. In this model, the excitatory neurons that are highly activated can create strong feedback on any of the three or double-legged connection models. To balance this effect, the model may maintain the learning rate in a low range and ensure that the continuously external input is presenting and presentable patterns are being excited. Hence, if the learning rate is increased, the recurrent dynamics will reinforce the neurons that are already highly excited. This can potentially create the weight clusters and interrupt the dynamic of the network by collapsing the active sub-group into the clusters.

The described model learns the eye movement and gaze stall patterns and expands it in collaboration with the sleep phase of the wake-sleep algorithm. In the sleep phase, the network learns how to predict by projecting a cheap approximation of the real posterior, which in this case are the parameters of the pre-recorded mental disorder model. All the activation in the sleep phase is the projection to the simulated network attractors. The firing rates and conditions of input populations can be all simulations based on the GLIF results.

The attractor states are technically a subgroup of neurons with high spiking and excitatory activation. In the wake phase, however, no extra input patterns are presented. In the wake phase, the model may apply learning rules that would be correct if the samples are taken from the true posterior. True posterior in this case, is the samples from the mental disorder model that is pre-recorded and borrowed from external sources. What drives the weight Metrix in this proposed model is the pre-established model from the GLIF and also driving the weights toward sets of weights for which the approximate posterior is a good fit for the real posterior while applying a 0.3 s for weight normalization.

Figure 3:
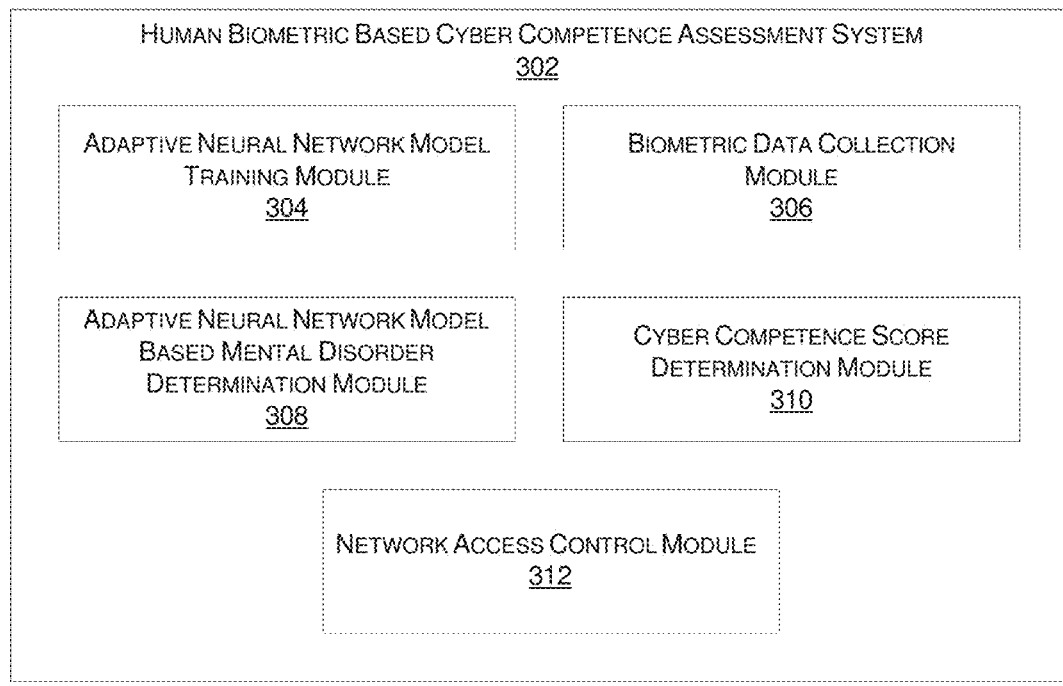
FIG. 3 illustrates functional modules of a human biometric-based cyber competence assessment system in accordance with an embodiment of the present disclosure.

FIG. 3 illustrates functional modules of a human biometric-based cyber competence assessment system in accordance with an embodiment of the present disclosure. The human biometric-based cyber competence assessment system 302, same as system 108, includes an adaptive neural network model training module 304. The adaptive neural network model training module 304 may use the model learning architecture 200 to train the model using a minimal training dataset. Once the adaptive neural network model is trained with basic intelligence, the model can be used for determining the mental disorder or mental disturbance level of a user.

The adaptive neural network model is trained using recorded eye movement data comprising of several populations of equivalently structured, interconnected, eye movement data represented in form of generic leaky integrate-and-fire neurons, which are trained with spike-timing-dependent plasticity (STDP).

System 302 includes a biometric data collection module 306 configured to collect human biometrics data from a biometric reader, which can be an eye movement tracking device, or an eye-movement tracking sensor embedded into the user device or acting as an independent device. System 302 uses an adaptive neural network model-based mental disorder determination module 308 to analyze and determine the mental disorder or mental disturbance level of a user based on the biometric data.

The adaptive neural network model-based mental disorder determination module 308 analyzes the human biometrics data using an adaptive neural network model that performs rational inference to learn the correlation between the human biometrics and mental disorder to determine a mental disorder. As described above, the adaptive neural network model can be trained using a wake-sleep machine learning engine in combination with a spiking recurrent network model. The wake-sleep machine learning engine is used to predict the mental disorder for a set of definitive cyber risks.

The wake-sleep machine learning engine in a sleep mode predicts next gaze transitions during a more intense and previously unseen visual task by exploiting the temporal context of gaze fixation and simulating attention shifts. The wake-sleep machine learning engine in wake mode undercovers correlating points between simulated gaze patterns to mental disorders. In an embodiment, the adaptive neural network model can be developed based on Generic-Leaky-Integrate-and-Fire (GLIF) neural network model.

System 302 may further use a cyber competence score determination module 310 to determine a cyber competence score based on the determined mental disorder. Module 310 may use a machine learning model to predict the cyber competence score of the user based on the determined mental disorder or mental disturbance level. Module 310 may also use a correlation database representing the mental disorder to cyber competence score correlation to determine the cyber competence score of the user.

System 302 includes a network access control module 312 configured to control network access of the user based on the cyber competence score. The network access control module 312 may initiate different prevention and correction actions based on the determined cyber competence score of the user. In an embodiment, module 312 may send an alert about their vulnerable status and how a cyber attacker can take advantage of such vulnerability. Module 312 also analyzes the network traffic log of the user and identifies activities that are suspicious and can take corrective measures.

Module 312 may send automatically disable access to protected network resources based on predefined rules related to mental disorders. Module 312 may similarly disable all network access, including wireless and wired connections if the cyber competencies score of the user is very low. Module 312 may also inform other connected devices and users connected with the user and user device about potential vulnerability, without disclosing the actual mental status of the user. As one will appreciate, a higher competence score indicates a healthy state of mind and may not require any preventive or corrective action. A lower competence score below a threshold indicates mental disorder or mental disturbance, and, hence, the system may take corrective and preventive action.

In an embodiment, system 302 may determine a correlation matrix by correlating the cyber competence score of the user with the network activity log of the user, wherein the network access is controlled based on the correlation matrix. The system may determine the cyber competence score of the user based on the correlation matrix using a machine learning model.

In an embodiment, the neural network model can be trained to detect mental disorder or mental disturbance level of the user based on other biometric data, such as pulse rate, heartbeat, etc. But it has been identified that the eye movement data can provide a better estimation of the actual mental condition of the user. Embodiments of the present disclosure are hence explained with respect to eye movement data.

Figure 4:
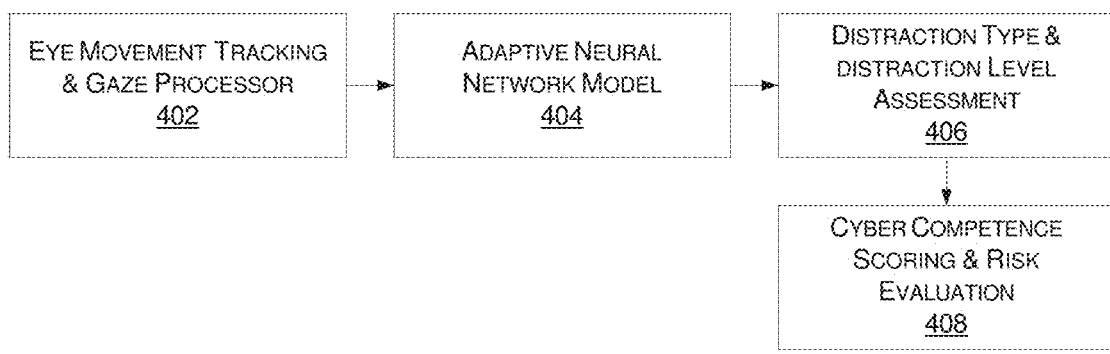
FIG. 4 is a block diagram illustrating the determination of cyber competence score based on human biometrics data in accordance with an embodiment of the present disclosure.

FIG. 4 is a block diagram illustrating the determination of cyber competence score based on human biometrics data in accordance with an embodiment of the present disclosure. As shown in FIG. 4, an eye-movement tracking and gaze processor 402 tracks eye movement of the user closely to detect blinking, gazing, fast or slow movement with respect to surroundings or displayed object, color, strain around the eyes, retinal movement, eyeball movement, etc. collectively referred to as eye movement data. The eye-movement tracking and gaze detection processor 402 may be part of a user device or a handheld device attached to the user device through a wireless communication interface or an independent device with a data communication interface.

The processor 402, which may be a microprocessor, may send the eye movement data to an adaptive neural network model 404. The adaptive neural network model 404 may be implemented as a cloud service to provide faster processing and better accuracy in determining mental status, mental disorder, or mental disturbance of a user. Model 404 may provide distraction type and distraction level assessment score 406, which may also be represented and summarized in form of a mental disorder or mental disturbance. In an embodiment, system 302 may perform cyber competence scoring and risk assessment based on the distraction type and/or distraction level assessment score.

Figure 5:
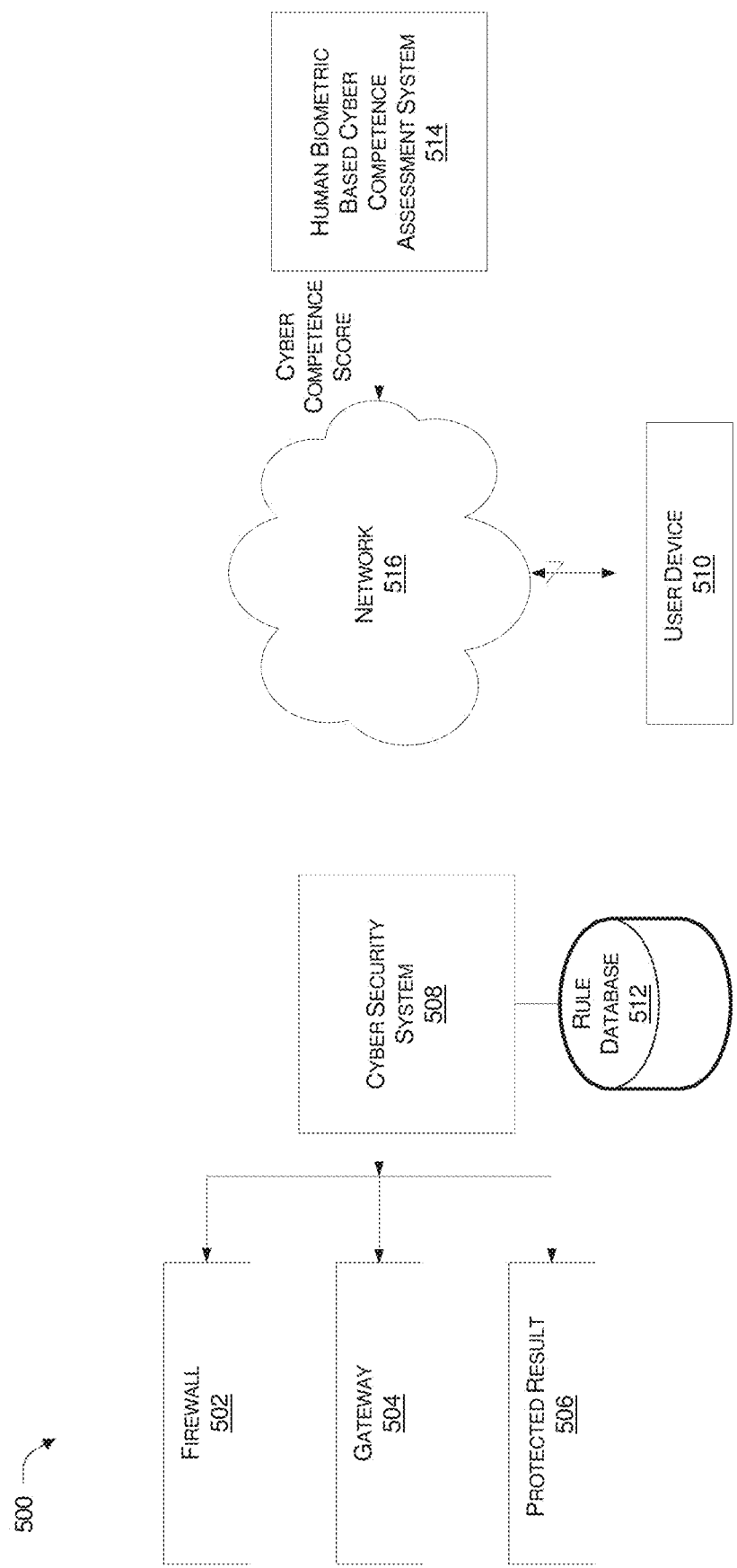
FIG. 5 illustrates a network security system integration with the cyber competence score assessment system to protect an enterprise network in accordance with an embodiment of the present disclosure.

FIG. 5 illustrates a network security system integration with the cuber competence score assessment system to protect an enterprise network in accordance with an embodiment of the present disclosure. The human biometric-based cyber competence assessment system 514, same as system 302, may send the cyber competence score to a cyber security 508 through a network 516. The Cyber security system 508 may refer to a rule database 512, which may have predefined assess request processing rules associated with the cyber complete score. The cyber security system 508 may alert the firewall 502, gateway 504, and other protected resources 506 about the cyber competence score of a user accessing user device 510. The cyber security system 508 may isolate the user device 510 from network 516 if the cyber competence of the user is very low or restrict the user's access to a protected network area.

FIG. 6 is an exemplary security rule that can be used to protect an enterprise network based on a cyber competence score in accordance with an embodiment of the present disclosure. In an embodiment, the network access control module 312 or the cyber security system 508 may use predefined rules to take appropriate actions using the reference table 600. Table 600 maintained in the form of a database may include mapping of mental disorder, competence score, and security rules. For example, the rule may indicate that for disorder-1, and a cyber competence score below 80%, access to protected network resources should be blocked. If the cyber competence score is greater than a defined threshold (e.g. 80%), no action is required and the user can continue using the network services. For a complete score below another threshold (e.g. 35%), the system may block or disable network access.

Figure 7:
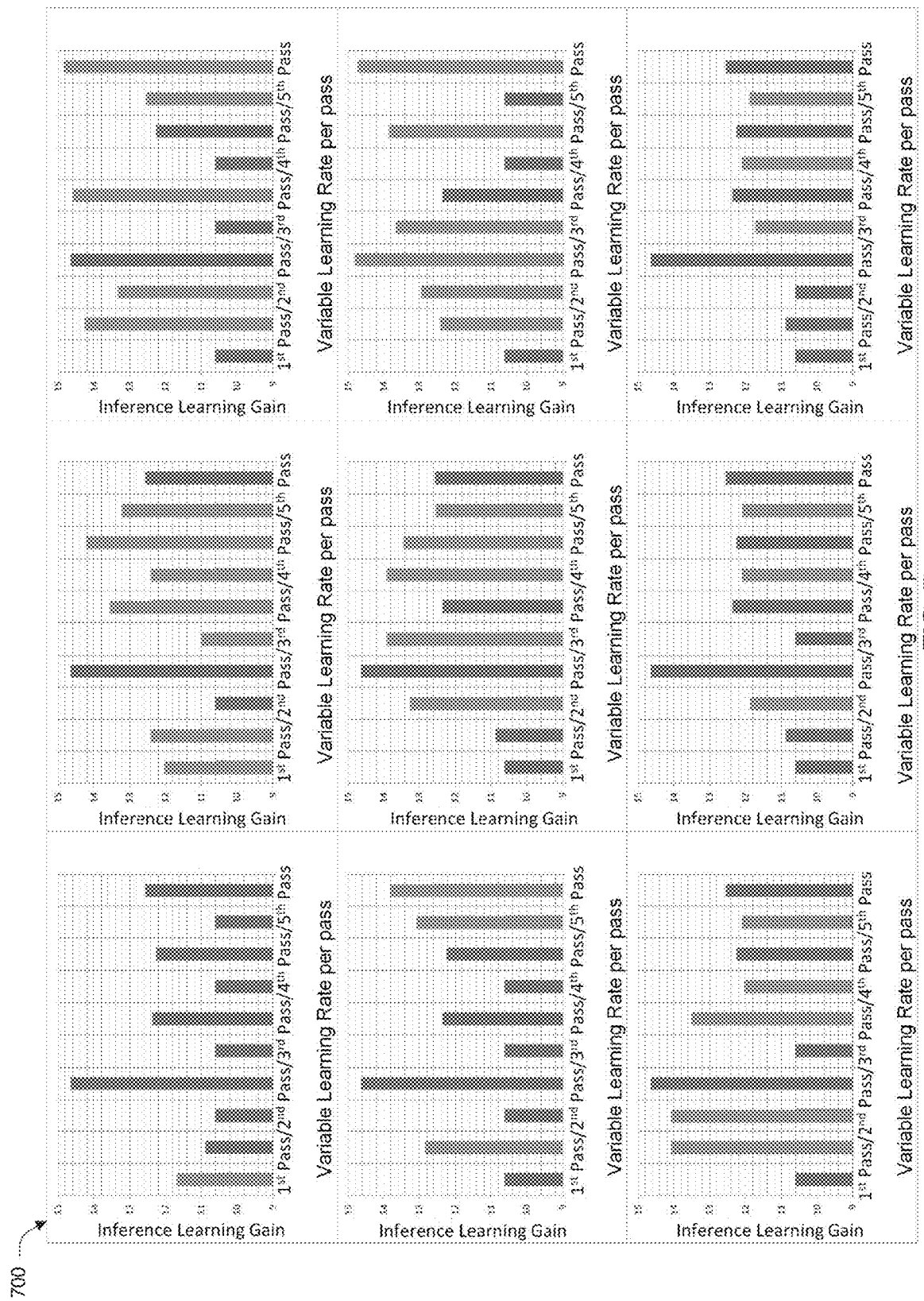
FIG. 7 illustrates graphs representing learning-inference gain over five passes with variable rates for the adaptive neural network model in accordance with an embodiment of the present disclosure.

FIG. 7 illustrates graphs representing learning-inference gain over five passes with variable rates for the adaptive neural network model in accordance with an embodiment of the present disclosure. The performance of the proposed system 302 can be tested. Graphs 700 shows the result of a test run on a variety of mobile platforms such as cellular phones and VR glass. The software recorded the attendance of participants to the task every 0.5 s. All the eye-tracking parameter's 2 data is later reviewed for the participant's performance against the designed features of curious distraction. Tasks are designed according to the distraction rules of the visual hallucinatory world with recordings of haptic responses in real-time, faster than real-time, or slower than real-time. The fast and slow modes, in contrast, presents visual effects to determine the participant's strategy and focus wandering.

Performance test of the system 302 was done on participants after taking consent. The duration of the test for each participant was less than a half-hour and the total time for data collection was about one hour. Participants were given written instructions about the intent of the experiment, without any mentions of the curious distractions, designed into each task. The participant was told to try to obtain the highest possible score, following any desired strategy during various test scenarios.

For all scenarios, all variations of the ten eye-tracking parameters were recorded during the multiple tasks. It was noted that variation of parameters is not uniformly linear for some scenarios, but parameters regression is coherent, and before updating the weight matrix, the weight convergence can be examined. In case of over or under-simulation, the results will run over. The goal of the test scenarios was to get the participants into the close situation of the maximum distractions by studying the reactions of the participants via their movement patterns. Hence, for the same categories of participants, one can expect similar results, even if the scenario and tasks are assigned in completely random order.

Each scenario was 5 mins long and prior to starting, each participant had to take a few trials runs. The details of attendance in trial practices were not recorded, but final parameter sets in each trial were recorded to note the data regression. The real scenarios were selected, that were different than trial practice, intended to stimulate the maximum random distraction. Finally, at the end of the test, a questionnaire was completed by a participant about the level of attention that they normally require during their daily work and proficiency of electronic devices as well as the duration of electronic devices usage per day.

The GLIF algorithm was run four to six times in each scenario with different learning rule parameters. This allowed the algorithm to adjust the intensity of learnings rules within the spaces with less good results. Some adjustments were also made to enable reasonable inference learning. This adjustment focused on the spike-timing dependant plasticity (STDP), to improve the GLIF performance and better the learning curve. The first adjustment was to compensate for the inconsistency of the human eye while switching between tasks with a scenario.

The second adjustment was to remove the complete stall after a certain time, which after a certain time was considered a non-attended task. There was also some captured uncertainty when the participant could not switch easily between releasing the haptic and switching the visual task. The tasks assignment were random but the task sequences and duration were identical between the participants. And since the eye-tracking parameters are discretely different, therefore they are being studied at the pairwise level. This means the GLIF learning task is conducted within each scenario and not between them.

The wake-sleep algorithm, however, uses the learned pattern of attendance between the participants and projects a simulation close to the pre-recorded results, and applies the maximum likelihood learning. Additionally, the haptic reactions were reviewed with respect to the attendance strategy. Finally, several types of graphs were generated to summarize different scenarios and how they converge into the close situation of the mental impairments via curious distractions.

When comparing the results of the above process with the pre-recorded data, the first few null hypotheses were rejected with high confidence, because there was evidence of the pre-recorded data regression has outperformed the WSA. Similarly, the return null hypothesis was also rejected for every scenario, due to a similar situation. Additionally, for most scenarios, the pre-recorded regression has outperformed the WSA, except for the time that participants were forced to switch between tasks much quicker. Besides the statistical comparison of this experiment's visual tracking parameters with the pre-recorded data of the mental condition, the WSA tends to predict a development pattern with the set target according to the mental impairment parameters.

Hence, further looking at the performance of all participants and the WSA performance of specific scenarios, a strategy that is thought to give the best result, called the "the great risk strategy" for each scenario had been proposed. The WSA success was initially to bring at least nearly 70% of eye-tracking parameters per scenario, up to near 100%. While the rest of the percentages were part of the participants learning curve and not a great contribution to the results. It was also noted that in specific cases some of the randomized parameters were also learned by the participants after the final results were reviewed. Hence, a selection of tasks was normalized to 50% contribution in favor of another group, which remained 100% random to the end. In addition, the best performer among the participants was recognized and tasked by more influential scenarios, to be more challenged by the differences in their recorded parameters.

FIG. 7 presents a summary of inference learning gain or weights across each task per different passes. A variable firing rate is dominantly controlled and measured until the sleep phase is initiated.

Figure 8:
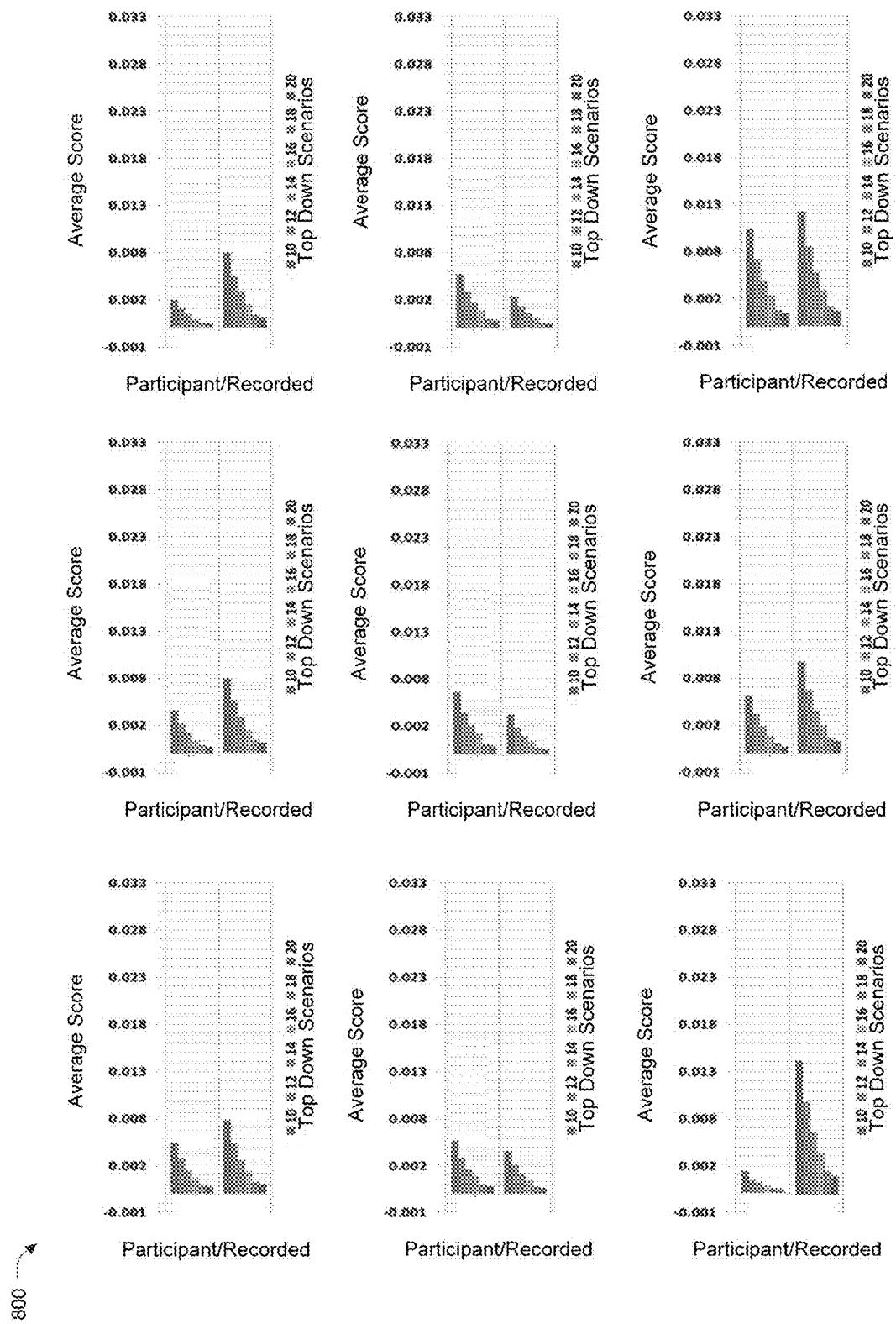
FIG. 8 illustrates graphs representing comparing score indexes between participant and pre-recorded data used to validate the working of the adaptive neural network model designed in accordance with an embodiment of the present disclosure.

FIG. 8 illustrates graphs representing comparing score indexes between participant and pre-recorded data used to validate the working of the adaptive neural network model designed in accordance with an embodiment of the present disclosure. Graphs 800 illustrate the statistical comparison between the score indexes, which is averaged between six different scenarios and recorded for six participants. The prerecorded eye-tracking parameters are also searched and organized to be specifically available contributing to the average comparison. In the figure, the significance of higher indexes is maintained between all scenarios, and hence the participant improvement is observable.

The system is designed based on the experimental results that mental health issues, can introduce a cyber-risk via impaired hedonic capacity and compulsive reward-seeking. A generic leaky integrate and fire neural learning model has been used to develop a mathematical model of eye-tracking under multiple concurrent tasks, for a user. The mathematical model is then learned by a wake-sleep algorithm to predict the future development of events. The WSA results were then compared with pre-recorded experiments, that were borrowed from other previous "mental issues vs eye-tracking" researches, to understand the risk per participant. A multi-platform experimental test was adopted to include the haptic feedbacks into the eye-tracking model. The system may use VR glasses, mobile cellular devices, and eye-tracking glasses, for eye movement tracking.

As one will appreciate, the system could be extended in numerous ways to support another use case. For example, the system can be used with some modification to capture a variety of safety risks associated with onboarding air passengers or allowing people into sensitive environments. The other suggested extension to this system is to investigate different scoring mechanisms and penalty factors for corrective action developments. The system can be used to analyze participants attending the experiments, such as investigating the effects of age, educations, fatigue, and gender-specific instructions, in a real-time and high-fidelity designed scenario.

The proposed system can prevent different types of cyber exploitation, especially using a user with a disturbed mental state. It has been observed that cyber exploitation in the form of social engineering can be designed in many ways, using several channels over the computers or cellphones that target the pleasure system deep inside the brain by presenting a reward mechanism and promoting the concept of curiosity distraction. Deep inside the brain, there are certain neural components that trig the mesolimbic dopamine pathway, which plays the primary role in the reward-seeking function and rewards normally contain satisfaction, liking, and learning components.

Different brain stimulation can associate a specific variety of components and may dissociate others. Unlike associative liking, the target components dissociation increases the risk of reward-seeking via collecting the abstractive reward incentive. The person, who is experiencing mental casualties, is often confused with the functional abstraction and often considers it as positive reward-seeking involving eager anticipation. Under these mental conditions, the effect of curious distraction is largely studied in special cases from brain temperament and fatigue, painful memory and PTSD, Alzheimer's, ADHD, autism, and types of neurodegenerative diseases. In recent years, however, there are increasing interest from employers to correlate the social cyber engineering risk with the employee mental abilities, such as dissociative learning, counterfeit pleasure-seeking, which produce intensive motivation to focus on the target. Hence, the employers would use the proposed system 302 to design an effective employee testing, which seems necessary for a quantitative improvement and ensure the effectiveness of risk measures. The social engineering tests supported by system 302 can be designed to target the weakest areas of human perception and can be used to propose additional rigors in the form of training and improve human performance.

The system uses a specific type of test, which triggers the anticipation function via visual distraction as a major contributor to the hyper-activation of the curious distraction on an impaired hedonic capacity and compulsive reward-seeking system. Hence, a neural network models the visual distraction via eye-tracking to map the entire tracking parameters. The map can then be analyzed using a machine-learning algorithm to predict any conditions that may lead to a possible correlation with the cyber security risk measures.

Figure 9:
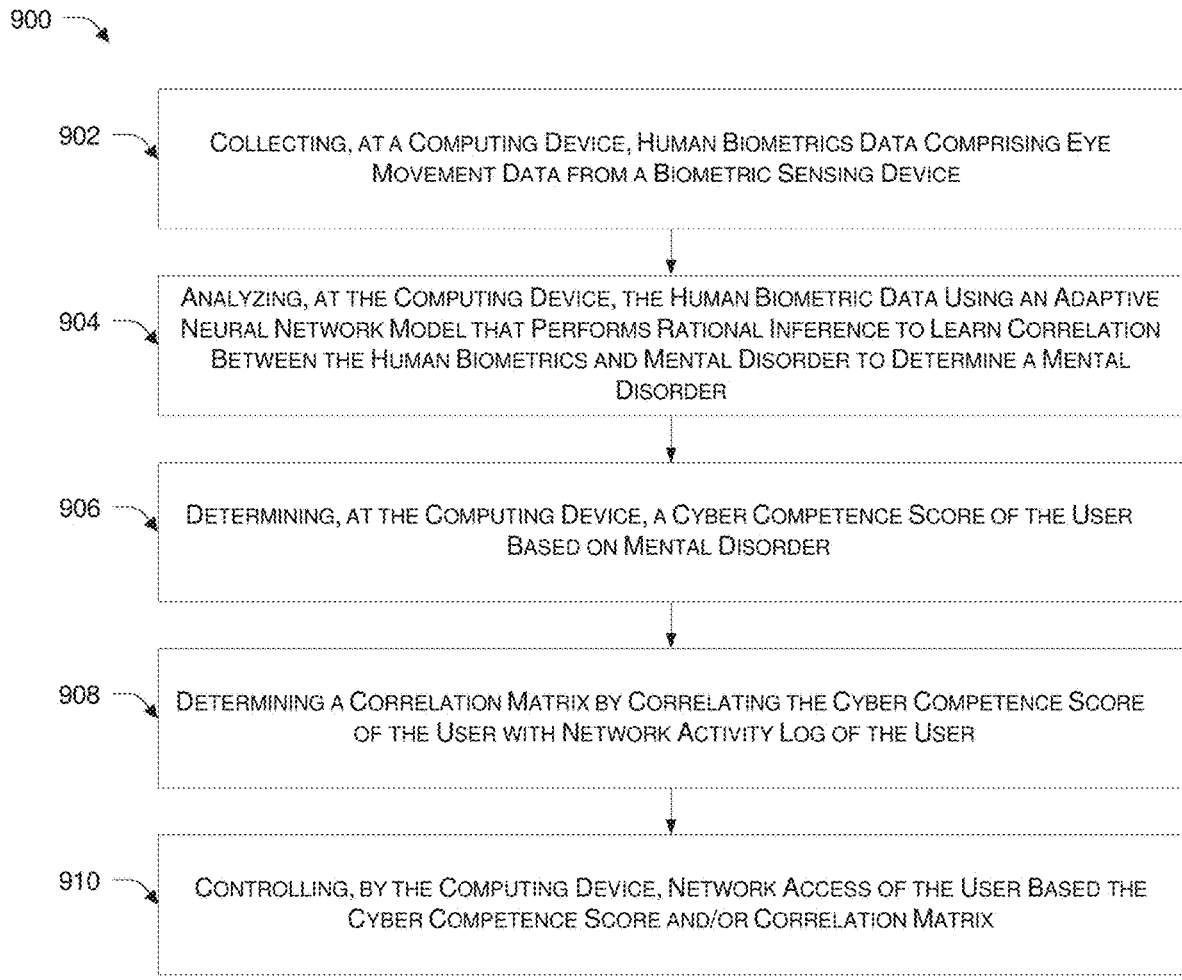
FIG. 9 is a process flow for assessing the cyber competence score of a user in accordance with an embodiment of the present disclosure.

FIG. 9 is a process flow for assessing the cyber competence score of a user in accordance with an embodiment of the present disclosure. The process 900 includes steps performed on a computing device. The steps include collecting human biometric data comprising eye movement data from a biometric sensing device, as shown at block 902, analyzing the human biometric data using an adaptive neural network model to determine a mental disorder, as shown at block 904, determining a cyber competence score of the user based on the mental disorder, as shown at block 906, determining a correlation matrix by collating the cyber competence score of the user with a network activity log of the user, as shown at block 908, and controlling network access of the user based on the cyber competence score and/or correlation matrix, as shown at block 910.

Figure 10:
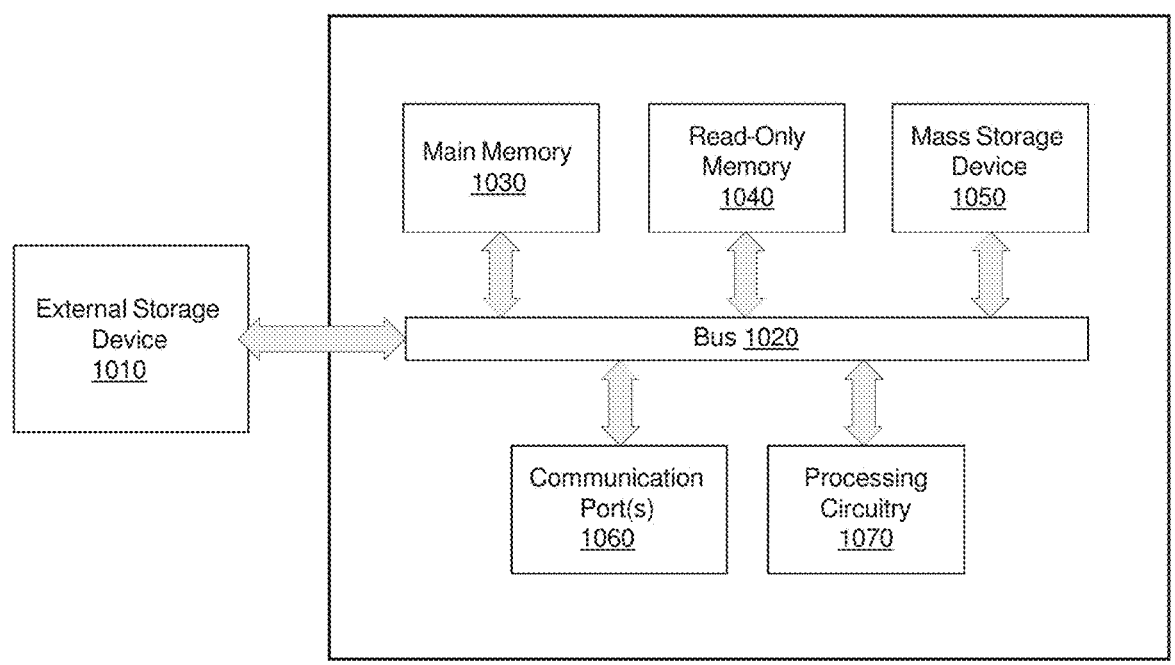
FIG. 10 illustrates an exemplary computer system in which or with which embodiments of the present invention may be utilized.

FIG. 10 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 10, the computer system includes an external storage device 1010, bus 1020, main memory 1030, read-only memory 1040, mass storage device 1050, communication port 1060, and processor 1070.

Those skilled in the art will appreciate computer system 1000 may include more than one processing circuitry 1070 and communication ports 1060. Processing circuitry 1070 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer.

In some embodiments, processing circuitry 1070 is distributed across multiple separate processors or processing units, for example, multiple of the same type of processing units (e.g., two Intel Core i7 processors) or multiple different processors (e.g., an Intel Core i5 processor and an Intel Core i7 processor). Examples of processing circuitry 1070 include, but are not limited to, an Intel® Itanium® or Itanium 2 processor(s), or AMD® Opteron® or Athlon MP® processor(s), Motorola® lines of processors, System on Chip (SoC) processors or other future processors. Processing circuitry 1070 may include various modules associated with embodiments of the present invention.

Communication port 1060 may include a cable modem, integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. Communication port 1060 can be any RS-232 port for use with a modem-based dialup connection, a 10/100 Ethernet port, a Gigabit, or a 10 Gigabit port using copper or fiber, a serial port, a parallel port, or other existing or future ports. Communication port 1060 may be chosen depending on a network, such as a Local Area Network (LAN), Wide Area Network (WAN), or any network to which the computer system connects.

Memory 1030 may include Random Access Memory (RAM) or any other dynamic storage device commonly known in the art. Read-only memory 1040 can be any static storage device(s), e.g., but not limited to, a Programmable Read-Only Memory (PROM) chip for storing static information, e.g., start-up or BIOS instructions for processing circuitry 1070.

Mass storage 1050 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) 10 recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. The non-volatile memory may also be used (e.g., to launch a boot-up routine and other instructions). Cloud-based storage may be used to supplement storage memory in 1030. Memory 1050 may be any current or future mass storage solution, which can be used to store information and/or instructions.

Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage, and communication blocks. Bus 1020 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1070 to a software system.

Optionally, operator and administrative interfaces, e.g., a display, keyboard, and a cursor control device, may also be coupled to bus 1020 to support direct operator interaction with computer systems. Other operator and administrative interfaces can be provided through network connections connected through communication port 1060. An external storage device 1210 can be any kind of external hard-drives, floppy drives, IOMEGA® Zip Drives, Compact Disc-Read-Only Memory (CD-ROM), Compact Disc-Rewritable (CD-RW), Digital Video Disk-Read Only Memory (DVD-ROM). The components described above are meant only to exemplify various possibilities. In no way should the aforementioned exemplary computer system limit the scope of the present disclosure.

The computer system 1000 may be accessed through a user interface. The user interface application may be implemented using any suitable architecture. For example, it may be a stand-alone application wholly implemented on the computer system 1000. The user interfaces application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 1000 is retrieved on-demand by issuing requests to a server remote to the computer system 1000. For example, computing device 1000 may receive inputs from the user via an input interface and transmit those inputs to the remote server for processing and generating the corresponding outputs. The generated output is then transmitted to the computer device 1000 for presentation to the user.

While embodiments of the present invention have been illustrated and described, it will be clear that the invention is not limited to these embodiments only. Numerous modifications, changes, variations, substitutions, and equivalents will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C, and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

What is claimed is:

1. A system for assessing cyber competence of a user, the system comprising:
    a) a processing unit;
    b) a memory unit; and
    c) coded instruction, stored in the memory unit, that, when executed by the processing unit, causes to
        i. collect human biometrics data comprising eye movement data from a biometric reader;
        ii. analyze the human biometrics data using an adaptive neural network model that performs rational inference to learn the correlation between the human biometrics and mental disorder to determine a mental disorder;
        iii. determine a cyber competence score of the user based on mental disorder, and
        iv. control network access of the user based on the cyber competence score.

2. The system of claim 1, wherein controlling the network access comprises alerting the user, disconnecting the network connection of the user, and alerting a second user.

3. The system of claim 1, wherein the adaptive neural network model is trained using a wake-sleep machine learning engine in combination with a spiking recurrent network model.

4. The system of claim 3, wherein the wake-sleep machine learning engine is used to predict the mental disorder for a set of definitive cyber risks.

5. The system of claim 3, wherein the wake-sleep machine learning engine in a sleep mode predicts next gaze transitions during a more intense and previously unseen visual task by exploiting the temporal context of gaze fixation and simulating attention shifts.

6. The system of claim 3, wherein the wake-sleep machine learning engine in wake mode undercovers correlating points between simulated gaze patterns to mental disorders.

7. The system of claim 1, wherein the adaptive neural network model is developed based on Generic-Leaky-Integrate-and-Fire (GLIF) neural network model.

8. The system of claim 1, wherein the adaptive neural network model is trained using recorded eye movement data comprising of several populations of equivalently structured, interconnected, eye movement data represented in form of generic leaky integrate-and-fire neurons, which are trained with spike-timing-dependent plasticity (STDP).

9. The system of claim 1, further determines a correlation matrix by correlating the cyber competence score of the user with the network activity log of a user, wherein the network access is controlled based on the correlation matrix.

10. The system of claim 9, the cyber competence score of the user is determined based on the correlation matrix using a machine learning model.

11. A method for assessing cyber competence of a user, the method comprising:
    a) collecting, at a computing device, human biometrics data comprising eye movement data from a biometric reader;
    b) analyzing, at the computing device, the human biometric data using an adaptive neural network model that performs rational inference to learn the correlation between the human biometrics and mental disorder to determine a mental disorder;
    c) determining, at the computing device, a cyber competence score of the user based on mental disorder; and
    d) controlling, by the computing device, network access of the user based on the cyber competence score.

12. The method of claim 10, wherein controlling the network access comprises alerting the user, disconnecting the network connection of the user and alerting a second user.

13. The method of claim 10, wherein the adaptive neural network model is trained using a wake-sleep machine learning engine in combination with a spiking recurrent network model.

14. The method of claim 13, wherein the wake-sleep machine learning engine is used to predict the mental disorder for a set of definitive cyber risks.

15. The method of claim 13, wherein the wake-sleep machine learning engine in a sleep mode predicts next gaze transitions during a more intense and previously unseen visual task by exploiting the temporal context of gaze fixation and simulating attention shifts.

16. The method of claim 13, wherein the wake-sleep machine learning engine in wake mode undercovers correlating points between simulated gaze patterns to mental disorders.

17. The method of claim 10, wherein the adaptive neural network model is developed based on Generic-Leaky-Integrate-and-Fire (GLIF) neural network model.

18. The method of claim 10, wherein the adaptive neural network model is trained using recorded eye movement data comprising of several populations of equivalently structured, interconnected, eye movement data represented in form of generic leaky integrate-and-fire neurons, which are trained with spike-timing-dependent plasticity (STDP).

19. The method of claim 10, further comprises steps of determining a correlation matrix by correlating the cyber competence score of the user with the network activity log of the user, wherein the network access is controlled based on the correlation matrix.

20. The method of claim 19, the cyber competence score of the user is determined based on the correlation matrix using a machine learning model.

* * * * *